Nov. 5, 1968    D. J. WARD    3,409,689
DEHYDROGENATION PROCESS
Filed May 23, 1966
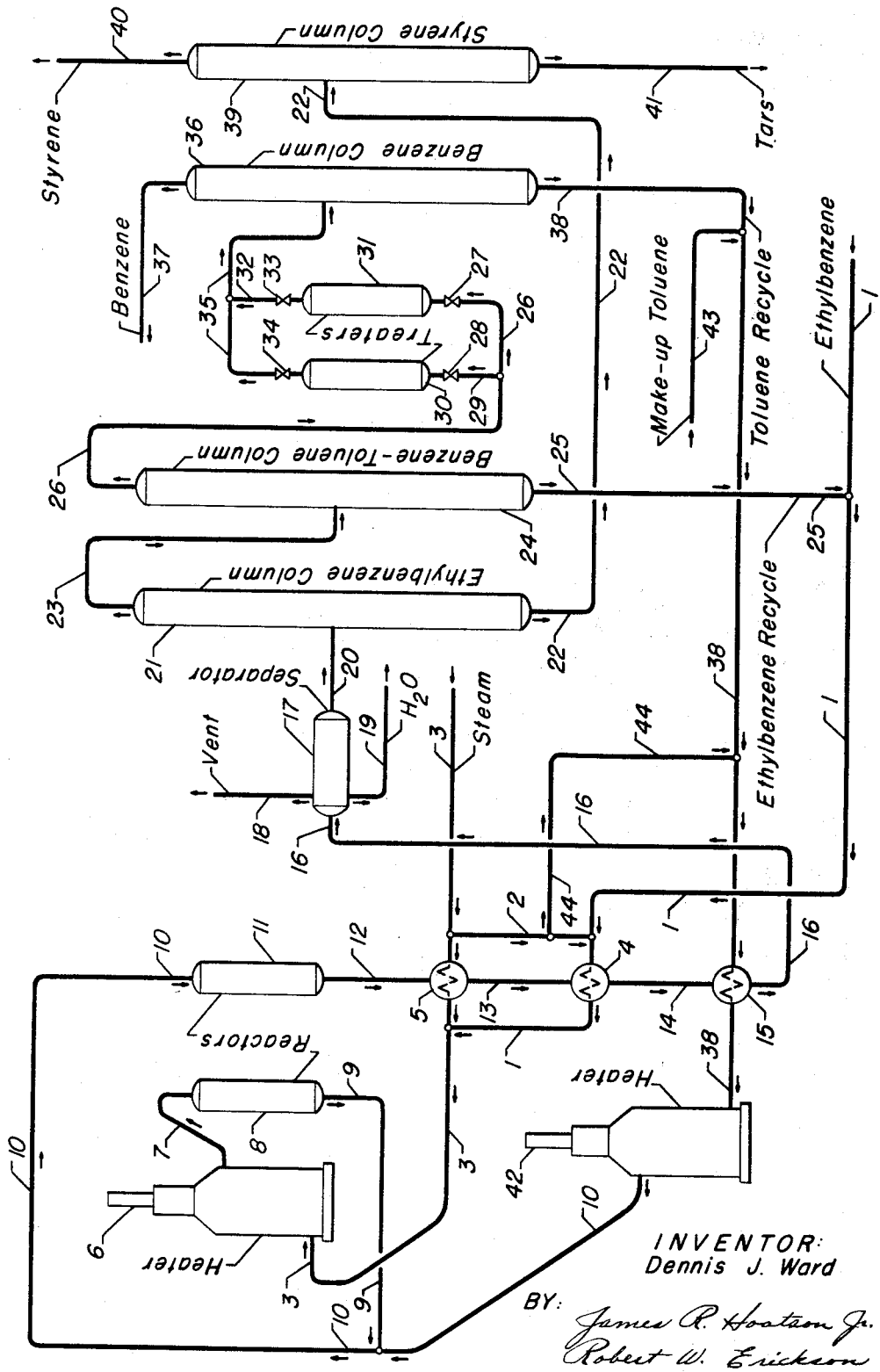
INVENTOR:
Dennis J. Ward
BY:
James R. Hoatson Jr.
Robert W. Erickson
ATTORNEYS United States Patent Office 3,409,689
Patented Nov. 5, 1968

3,409,689
DEHYDROGENATION PROCESS
Dennis J. Ward, Lombard, Ill., assignor to Universal Oil Products Company, Des Plaines, Ill., a corporation of Delaware
Filed May 23, 1966, Ser. No. 552,290
18 Claims. (Cl. 260—669)

ABSTRACT OF THE DISCLOSURE

Catalytic dehydrogenation of an alkyl aromatic hydrocarbon in which the alkyl contains at least two carbon atoms by commingling the alkyl aromatic hydrocarbon with steam and a methyl-substituted aromatic hydrocarbon, such as toluene, the mol ratio of alkyl aromatic hydrocarbon to methyl-substituted aromatic hydrocarbon being in the range of 0.5:1 to 10:1, and contracting the resulting steam-hydrocarbon mixture with a dehydrogenation catalyst at a temperature of 1050°–1300° F., and a pressure of atmospheric to 100 p.s.i.g.

The present invention relates to a catalytic process for effecting the dehydrogenation of hydrocarbons, and is particularly directed toward the conversion of alkyl aromatic hydrocarbons having an alkyl side chain containing at least two carbon atoms per molecule. Specifically, the present invention involves a more economical catalytic method for obtaining increased yields of styrene, and various homologs and analogs thereof, through the hydrogenation of ethylbenzene, and other alkyl aromatic hydrocarbons including diethylbenzene, isopropylbenzene, ethyltoluene, etc.

Styrene, or phenylethylene, is extensively employed throughout commercial industries as the starting material in the manufacture of a multitude of resins, plastics and elastomers, the wide-spread use being attributed primarily to the ability of styrene to polymerize readily. For example, "Buna-S" rubber is a high molecular weight product produced by the copolymerization of styrene with butadiene; similarly, other high molecular weight materials are manufactured through the copolymerization of styrene with substances such as isoprene, acrylonitrile, chloroprene, etc. Although styrene is recovered from various coal tars and heavy crude oils, in order to satisfy the market demand it is necessary to synthesize large quantities by the method which involves the dehydrogenation of ethylbenzene. As hereinabove set forth, the present invention particularly involves a process for dehydrogenating ethylbenzene to produce styrene, and specifically offers an improvement in a process for the catalytic steam-dehydrogenation of ethylbenzene.

It is recognized that the production of styrene is well known within the prior art, both with respect to the dehydrogenation process and the varieties of the catalytic composite employed therein. For example, styrene is produced by rapidly passing a mixture of ethylbenzene and steam over a fixed bed of a suitable dehydrogenation catalyst at elevated temperature. Regardless of the catalyst employed, many such processes admix the ethylbenzene charge stock, existing at below the reaction temperature, with steam which has been superheated to a temperature above the reaction temperature, and to the extent that it is capable of supplying the requisite quantity of heat (the process is endothermic) to effect the desired degree of reaction; the mixture is in the correct proportion to produce the desired initial reaction temperature. Other prior art processes have indicated, and at least partially overcome the disadvantages of this type of dehydrogenation process. The obvious disadvantage is that extremely hot, superheated steam, at the instant it is admixed with the ethylbenzene charge, causes at least a portion of the ethylbenzene to be raised to a temperature at which ethylbenzene tends to undergo decomposition through pyrolysis. In many instances, the pyrolysis is effected to a degree such that the process becomes uneconomical due to an exceedingly high yield loss to carbon monoxide, carbon dioxide, tars, etc. Another disadvantage is involved with the utility cost in raising the temperature of large quantities of steam to a level far above that required for effecting the dehydrogenation of the ethylbenzene. Other prior art processes involve mixing the ethylbenzene and steam at a temperature level below that at which dehydrogenation occurs, the mixture being heated to the desired temperature at which dehydrogenation is effected, and then introduced into the dehydrogenation reaction zone. Allegedly, this prior art scheme results in increased yields, due ultimately to the inhibition of ethylbenzene pyrolysis as a result of not superheating the steam to an excessive degree.

I have discovered a new improved method for effecting the steam dehydrogenation of ethylbenzene, which method permits high ultimate yields of styrene, while simultaneously decreasing the quantity of heat (B.t.u/hr.) required for a given quantity of ethylbenzene charged, thereby effecting a decrease in the operating cost attributed to utilities.

Accordingly, it is an object of the present invention to provide a more economical method for dehydrogenating an alkyl aromatic hydrocarbon, containing at least two carbon atoms in the alkyl side chain, without experiencing high yield loss otherwise resulting from the excessive formation of tars, gaseous waste products, etc.

A principal object of the present invention resides in a process for dehydrogenating ethylbenzene to produce styrene, which process can function at close equilibrium conversion without suffering from an excessive degree of side reactions leading to decreased efficiency, excessive cracking resulting in the over-production of waste gases, or the deposition of carbon onto and within the catalyst, thereby shielding the active surfaces and centers thereof from the material being processed.

Another object involves affording a high-conversion dehydrogenation process, i.e. greater than 60.0%, having an unusually high conversion efficiency, i.e. greater than 90.0%.

In a broad embodiment, therefore, the invention herein described relates to a process for dehydrogenating an alkyl aromatic hydrocarbon having a side chain containing at least two carbon atoms per molecule, which process comprises commingling said alkyl aromatic hydrocarbon with steam and a methyl-substituted aromatic hydrocarbon; contacting the resulting steam-hydrocarbon mixture with a dehydrogenating catalyst in a reaction zone at dehydrogenating conditions; separating said methyl-substituted aromatic hydrocarbon from the resulting reaction product effluent; and, recovering the dehydrogenated product of said alkyl aromatic hydrocarbon.

Another embodiment involves a process for dehydrogenating ethylbenzene to produce styrene, which process comprises commingling said ethylbenzene with steam and toluene in an amount to result in a steam-hydrocarbon mixture in which the ethylbenzene to toluene mol ratio is within the range of from about 0.5:1 to about 10.0:1; heating said mixture to a temperature of from about 1050° F. to about 1300° F., and contacting the heated mixture with a dehydrogenation catalyst in a dehydrogenating reaction zone at dehydrogenating conditions; separating toluene from said effluent, recycling the toluene to combine with said ethylbenzene; and, recovering styrene from the remaining portion of said effluent.

A specific embodiment encompasses a high-conversion process for dehydrogenating an alkyl aromatic hydrocarbon, having an alkyl side chain containing at least two carbon atoms per molecule, which process comprises the steps of: (a) heating said alkyl aromatic hydrocarbon to a temperature below about 932° F., separately heating steam to a temperature above about 932° F., and commingling the thus heated streams; (b) heating said mixture to a temperature of from about 1050° F. to about 1300° F., and contacting the heated mixture in a first reaction zone with a dehydrogenating catalyst and at dehydrogenating conditions selected to dehydrogenate at least a portion of said alkyl aromatic hydrocarbon; (c) separately heating a methyl-substituted aromatic hydrocarbon to a temperature above about 1050° F. and commingling the first reaction zone product effluent therewith; and (d) passing the resulting mixture into a second reaction zone at a temperature of from about 1050° F. to about 1300° F. and effecting additional dehydrogenation of said alkyl aromatic hydrocarbon.

From the foregoing embodiments, it will be noted that the present invention encompasses a catalytic process for effecting the steam-dehydrogenation of alkyl aromatic hydrocarbons having an alkyl side chain containing at least two carbon atoms per molecule. It is, therefore, applicable to the dehydrogenation of ethylbenzene, diethylbenzene, ethyltoluene, propylbenzene, isopropylbenzene, butylbenzene, isobutylbenzene, and the corresponding naphthalene and anthracene counterparts thereof, etc. The process is further characterized in that the alkyl aromatic hydrocarbon is admixed with a methyl-substituted aromatic hydrocarbon prior to effecting the steam-dehydrogenation of the alkyl side chain. Suitable methyl-substituted aromatic hydrocarbons include, but not by way of limitation, toluene, o-xylene, m-xylene, p-xylene, mixed xylenes, methyl naphthalenes, etc. The alkyl aromatic hydrocarbon, such as ethylbenzene, and the methyl-substituted aromatic hydrocarbon, such as toluene, are in a mol ratio of ethylbenzene to toluene within the range of from about 0.5:1 to about 10.0:1. Operating conditions include a pressure from atmospheric to about 100 p.s.i.g., although lower intermediate pressures of from 5.0 to about 40.0 p.s.i.g. will generally be utilized. The stream charged to the reaction zone, having disposed therein a suitable catalytic composite, will have been previously heated to a temperature of from about 1050° F. to about 1300° F., the reaction product effluent therefrom having a temperature of from about 950° F. to about 1200° F.

As hereinbefore stated, the steam-dehydrogenation process is rather well known in the prior art, and is widely practiced in commercial industries. Many of the prior art processes involve the technique of heating the hydrocarbon charge to a temperature below the dehydrogenation temperature of 932° F., separately heating steam to a temperature below the dehydrogenation temperature, i.e. by indirect heat-exchange with product streams, admixing the thus-heated streams, the mixture then being heated to a temperature above the dehydrogenation temperature, and to a level such that the reaction product effluent has a temperature in the range of from 950° F. to about 1200° F. Such prior art processes are significantly enhanced through the practice of the improved method of the present invention which comprises: (a) heating said alkyl aromatic hydrocarbon to a temperature above about 932° F.; (b) separately heating steam and a methyl-substituted aromatic hydrocarbon to a temperature above about 932° F., and commingling the thus heated stream with said alkyl aromatic hydrocarbon, forming a steam-hydrocarbon mixture having a temperature lower than said reaction product effluent; (c) heating said mixture to a temperature above that of said reaction product effluent; and, (d) introducing the steam-hydrocarbon mixture to said reaction zone at dehydrogenating conditions as aforesaid.

In the preceding embodiment, it will be noted that the present invention encompasses a process in which the temperature at which the dehydrogenation is effected, and the temperature of the principal streams, mainly the ethylbenzene charge, toluene, steam, mixture of ethylbenzene and steam, and the mixture of ethylbenzene and toluene are carefully controlled. A specific embodiment, by which the present process is effected at high-conversion, will be more clearly understood upon reference to the accompanying drawing, hereinafter described in detail. It is understood, however, that the drawing is presented for the sole purpose of illustrating a high-conversion embodiment, and that the present invention is not to be limited to the operating conditions, the quantities of material employed, and/or the particular flow which is diagrammatically illustrated. Furthermore, although the present invention encompasses a catalytically-conducted process, it is understood that the same is not to be unduly restricted to the use of a particular catalytic composite having a particular concentration of components.

In order that a steam dehydrogenation process might achieve commercial success, the use of a suitable dehydrogenation catalyst is required. Thermal dehydrogenation can be carried out provided a sufficiently high temperature is utilized; however, due to high temperature pyrolysis, the main reactions are cracking, ring-opening and dealkylation, which reactions are undesirable from the standpoint of product quality and yield. At temperatures sufficiently low to avoid the deleterious cracking and ring-opening reactions, little or no dehydrogenation of the alkyl side chain takes place. The use of suitable dehydrogenation catalysts avoids this difficulty by permitting a relatively low temperature operation for dehydrogenation while avoiding excessive cracking and ring-opening. It is recognized that the prior art processes for dehydrogenation are replete with suggestions of numerous catalysts which can be used in promoting the relatively low temperature dehydrogenation reaction. Such catalysts generally consist of one or more metallic components selected from the metals of Groups VI and VIII of the Periodic Table, and compounds thereof. These catalysts are employed either unsupported, generally in powder or small particle form, or supported, or carried by a suitable refractory inorganic oxide material. Thus, suitable catalytic composites have been found to comprise one or more components selected from chromium, tungsten, molybdenum, iron, cobalt, nickel, platinum, palladium, iridium, ruthenium, rhodium, osmium, and various compounds thereof. These are generally composited with a carrier material comprising one or more inorganic oxides from the group of alumina, silica, zirconia, magnesia, thoria, hafnia, titania, boria, etc.

In conjunction with the various considerations involved in selecting a suitable catalyst, there is the aspect of reaction equilibrium to consider. Dehydrogenation is generally effected at conditions including a temperature in the range of from 750° F. to about 1300° F., a pressure from 0 to 100 pounds per square inch gauge, and a liquid hourly space velocity within the range of from about 0.1 to about 10.0, based upon the hydrocarbon charge. When operating at, or extremely close to equilibrium conversion, regardless of the character of the catalyst being used, or the degree to which it successfully promotes dehydrogenation, various side reactions, including at least some cracking, are effected, and the conversion efficiency drops off sharply. For instance, in a process for the dehydrogenation of ethylbenzene at close to equilibrium conditions, a significant degree of ring-opening and dealkylation results. These, as well as other side reactions, including polymerization, obviously detrimentally affect the efficiency of conversion to styrene, and tend to adversely affect the economic considerations of the process.

A typical catalyst employed for the dehydrogenation of alkyl aromatic hydrocarbons, and suitable for use herein, is an alkali-promoted iron catalyst of the type commonly known as "Shell 105" or "Shell 205." Such a catalyst may consist essentially of 85.0% by weight of ferrous oxide, 0.2% by weight of chromia, 12.0% by weight of potassium hydroxide, and 1.0% by weight of sodium hydroxide, or 90.0% by weight of iron oxide, 4.0% by weight of chromia and 6.0% by weight of potassium carbonate. While these known commercial dehydrogenation catalysts are probably most commonly employed, other dehydrogenation known catalysts will suffice, and include ferrous oxide-potassium oxide, other metal oxides and/or sulfides, including those of calcium, lithium, strontium, magnesium, beryllium, zirconium, tungsten, molybdenum, titanium, hafnium, vanadium, aluminum, chromium, copper, and mixtures of two or more including chromia-alumina, alumina-titania, alumina-vanadia, etc. The various methods of preparing the aforesaid dehydrogenation catalysts are well known within the prior art, and it is understood that the present process is not dependent upon the utilization of a catalytic composite manufactured in any particular manner.

In the interest of simplicity, and for the purpose of describing the present invention clearly and concisely, the following discussion will be restricted to a catalytic process for the steam-dehydrogenation of ethylbenzene, in the presence of toluene, to produce styrene. Since slight modifications of the following techniques will result in an operable process involving another alkyl aromatic hydrocarbon and/or methyl-substituted hydrocarbon, it is understood that the discussion is primarily for illustration, and is not intended to limit the invention beyond the scope and spirit of the appended claims.

An essential feature of the present process resides in the use of a methyl-substituted aromatic hydrocarbon, and preferably toluene, in admixture with the ethylbenzene charge. Among the more salient advantages resulting from the use of toluene resides in the totally unexpected increase in selectivity achieved when using this material with the common ethylbenzene dehydrogenation catalysts. The use of toluene decreased the tendency for the ethylbenzene to undergo dealkylation reactions, and, therefore, the yield of styrene is increased. In this regard also, toluene is a by-product of some of the side reactions—virtually impossible to inhibit completely and continue to obtain acceptable styrene yields—being effected in the system. Through recycle of the toluene, any reversible reactions occuring to produce such material are suppressed. In addition, the minor degree of toluene demethylation which takes place produces benzene, and thereby enhances the value of the total liquid product effluent. This is reflected in a comparison of results obtained with and without toluene addition (hereinafter described in detail), wherein, with toluene added, there was experienced a high conversion of ethylbenzene per pass, a higher yield of styrene product, a higher degree of efficiency of conversion, an increased amount of benzene product in lieu of the lower value toluene product, and no net loss of toluene.

Another salient feature is the heat capacity per pound of toluene as opposed to that of steam. Thus, fewer pounds of toluene are necessary for a given, required amount of re-heat. Furthermore, the lower latent heat of vaporization of toluene requires the expenditure of lesser quantities of thermal energy in the case involving a process with recycle features. As hereinafter indicated in a specific example, these heating characteristics of toluene resulted in a decrease in the amount of energy (B.t.u./hr.) necessarily supplied by the steam.

As hereinbefore set forth, one embodiment of the present invention is uniquely applicable to a dehydrogenation process exemplified by a prior art process in which the ethylbenzene charge and steam are each separately heated to a temperature below the dehydrogenation temperature of 932° F., admixed and then heated to a temperature above 932° F. (to a level such that the reaction product effluent has a temperature of from 950° F. to about 1200° F.), prior to being introduced into a reaction zone. Without more, and wherein there is a single catalyst bed within the reaction zone, such a process is commonly referred to as a "low-conversion" process from which the conversion per pass is limited by equilibrium considerations to about 40.0%, while continuing to achieve acceptable efficency of conversion. The application of the present invention to such a process is illustrated by comparing the economics of the two systems by way of heat-balance considerations.

The common basis for the comparison will be an ethylbenzene charge rate of one pound per hour, a reaction zone pressure of 100 pounds per square inch, and steam available at a pressure of 150 p.s.i.g. In the prior art process, 2.77 pounds of steam are introduced, and, of this amount, 0.67 pound is initially admixed with the ethylbenzene charge, the mixture passing through a first heat-exchanger (the heating medium being the reaction product effluent as it leaves the reactor), wherein the temperature is raised to 788° F. The remaining portion of the steam, 2.10 pounds, is passed through a second heat-exchanger, wherein the temperature is brought to a level of 635° F. The two streams leaving these heat-exchangers are admixed, the mixture passing into a heater to raise the temperature to 1137° F., the inlet to the reactor. The reaction product effluent leaves the reactor at a temperature of 1015° F.

Heat-balance considerations of this prior art scheme, required to determine the heater duty necessary for increasing the total reactor charge to 1137° F., are presented in the following Table I:

TABLE I

| Stream | T/P* | Lb./Hr. | B.t.u./lb. | B.t.u./hr. |
|---|---|---|---|---|
| Steam | 635/50 | 2.1 | 1,343 | 2,820 |
| Do | 788/50 | 0.67 | 1,416 | 949 |
| Ethylbenzene | 788/50 | 1.0 | 485 | 485 |
| Total | | | | 4,254 |
| Steam | 1,137/00 | 2.77 | 1,603 | 4,440 |
| Ethylbenzene | 1,137/00 | 1.0 | 713 | 713 |

*Temperature and pressure of the indicated stream.
Total Heater Duty: 5,153−4,254=899 Bt.u/hr.

In illustration, the process of the present invention, as hereinbefore set forth, involves a total of 2.07 pounds of steam, 0.67 pound of which is initially admixed with the 1.0 pound of ethylbenzene charge, and 1.40 pounds of which is admixed with 0.70 pound of toluene. The steam-ethylbenzene mixture, via heat-exchange with the reaction product effluent, is raised to a temperature of 1000° F. The remaining portion of the steam in admixture with the toluene, is raised, via heat-exchange, to 675° F., and further heated to a level of 1080° F. The two streams are then admixed, the resulting temperature being 1060° F., and the total mixture passed into a second heater to raise the temperature thereof to 1137° F., the inlet to the reaction zone. The temperature of the total reaction product effluent, employed for heat-exchange with the incoming streams, is 1070° F. The total heater duty for this system is calculated as shown in the following Table II:

TABLE II

| Stream | T/P* | Lb./hr. | B.t.u./lb. | B.t.u./hr. |
|---|---|---|---|---|
| Steam | 675/150 | 1.40 | 1,363 | 1,910 |
| Toluene | 675/150 | 0.70 | 417 | 292 |
| Total | | | | 2,202 |
| Steam | 1,080/150 | 1.40 | 1,571 | 2,200 |
| Toluene | 1,080/150 | 0.70 | 655 | 458 |
| Total | | | | 2,658 |
| Steam | 1,080/150 | 1.40 | 1,571 | 2,200 |
| Toluene | 1,080/150 | 0.70 | 655 | 458 |
| Steam | 1,000/150 | 0.67 | 1,529 | 1,024 |
| Ethylbenzene | 1,000/150 | 1.00 | 621 | 621 |
| Total | | | | 4,303 |
| Steam | 1,137/100 | 2.07 | 1,603 | 3,318 |
| Toluene | 1,137/100 | 0.70 | 692 | 484 |
| Ethylbenzene | 1,137/100 | 1.00 | 713 | 713 |
| Total | | | | 4,515 |

Heater Duty: 2,658−2,202=456 B.t.u./hr.
*Temperature and pressure of the indicated stream.
Heater Duty: 4,515−4,303=212 B.t.u./hr.
Total Heater Duty: 456+212=668 B.t.u./hr.

For the purposes of the comparison, it should be noted that the total pounds of material, 3.77, including the one pound of ethylbenzene charge, was the same in both systems, as was the temperature at the inlet to the reaction zone.

The total heater duty of the process of the present invention, per pound of ethylbenzene charge, is 668 B.t.u./hr., or 75% of the 899 B.t.u./hr. required for the prior art process. In the examples illustrated in Tables I and II if the heated feeds are allowed to pass over a catalyst at an appropriate space velocity, it would be found that the exiting temperature would be 1037° F. or 100° F. less than the inlet. At this time it could be determined that for the stream described in Table I, 0.40 pound of ethylbenzene have disappeared to produce 0.36 pound of styrene. The energy required per pound of styrene produced for this instance is 2497 B.t.u. When the material described in Table II is allowed to pass over the catalyst and experience a 100° F. temperature drop it is determined that 0.42 pound of ethylbenzene have disappeared to produce .386 pound of styrene so that the energy required per pound of styrene is only 1731 B.t.u., or 69% of the 2497 B.t.u. required for the prior art process. Thus, the foregoing portion of the specification, and the illustration, clearly indicate the method by which the dehydrogenation process of the present invention may be effected, and the benefits afforded through the use thereof. Prior art processes, without the addition of the toluene, either in which the superheated steam is contacted with a relatively cold ethylbenzene charge prior to entering the reaction zone, or where the steam and ethylbenzene, existing at temperatures below dehydrogenation, are admixed and subsequently brought to the temperature of the dehydrogenation reaction zone, require at least about 25.0% additional heater utility cost (per pound of ethylbenzene processed) in attaining the desired dehydrogenation reaction zone temperature, at a reduced yield of styrene.

With respect to a "high-conversion" dehydrogenation process, considered to be about 60.0% conversion with respect to ethylbenzene, the basic process requires considerable revision in order to achieve an acceptable degree of efficiency of conversion, or, in other words, economical styrene yield considering the quantity of ethylbenzene which is converted. Some prior art schemes involve multiple catalyst beds with intervening steam injection as a means for increasing conversion without detrimentally affecting efficiency. Others involve multiple reaction zones with inter-heating of the steam and ethylbenzene charge and/or each reaction product effluent: in some of these instances the ethylbenzene charge enters the first zone only, while steam is supplied at the inlet of all reaction zones.

The preferred method for achieving high ethylbenzene conversion, with increased efficiency, utilizing the inventive concept herein described, involves multiple reaction zones and particular handling of the various input streams. This method is detailed in the accompanying drawing which is illustrative of a specific embodiment. Only those vessels and lines necessary for a complete and clear understanding of this embodiment, have been included. Miscellaneous appurtenances, including valves, controls, pumps, compressors, separators, reboilers, etc., have been either reduced in number or completely eliminated. It is understood that the drawing is presented for the sole purpose of illustrating a preferred embodiment of the present invention, and that the latter is not intended to be unduly limited to the reactants, quantities, rates, operating conditions, etc., utilized in the illustration. Various modifications to these and other process variables, as well as slight modifications in the indicated flow diagram, can be made by those possessing expertise in petroleum refining technology, and particularly in the art of hydrocarbon dehydrogenation.

With reference now to the accompanying drawing, illustrating the production of styrene via the method of steam-dehydrogenation of ethylbenzene, the ethylbenzene enters the process through line 1, being admixed with recycle ethylbenzene in line 25, the source of which is hereinafter described. Under normal conditions of operation, the ethylbenzene charge, including the ethylbenzene recycle, in line 1 is at a temperature of about 100° F. Since the ethylbenzene recycle in line 25, in some situations, may contain minor quantities of styrene, it is preferred initially to vaporize the charge in line 1 with a small amount of steam to inhibit the formation of styrene polymer while raising the temperature of the charge. Thus, the ethylbenzene in line 1 is admixed with from about 3.0% to about 15.0% by weight of the total amount of steam utilized in the overall process and entering through line 3; this smaller quantity of steam is removed from line 3 through line 2, the steam-ethylbenzene mixture, at a temperature of about 325° F., passing into heat-exchanger 4. As hereinafter described, at least a portion of the incoming steam in line 3, being withdrawn via line 2, is diverted through line 44 to be admixed with toluene recycle in line 38, the source of which is hereinafter indicated. That portion of the incoming steam not withdrawn from line 3 via lines 2 and 44, passes through heat-exchanger 5, wherein its temperature is increased as a result of the relatively high-temperature reaction product effluent in line 12. The steam leaving heat-exchanger 5 is admixed with the steam-ethylbenzene mixture in line 1, previously heated in heat-exchanger 4, the latter at a temperature at about 650° F., resulting in a mixture having a temperature of about 900° F. The steam-ethylbenzene continues through line 3 into heater 6, wherein the temperature thereof is increased to a level of 1155° F., which temperature is within the dehydrogenation temperature range of from about 1050° F. to about 1300° F. The heated steam-ethylbenzene mixture leaves heater 6 via line 7, and is introduced into reactor 8.

The pressure at the inlet to reaction zone 8 is about 15 p.s.i.g., being within the preferred range of from about 5.0 to about 40.0 p.s.i.g. The total reaction product effluent, at a temperature of about 1100° F., is withdrawn via line 9, and is admixed with a steam-toluene mixture in line 10. Toluene is added to the process, as needed, via line 43 into line 38 which contains toluene recycle from benzene column 36. The toluene continues through line 38, being admixed with from about 3.0% to about 15.0% by weight of steam via line 44, and continues at a temperature of about 200° F. into heat-exchanger 15. The steam-toluene mixture is raised to a temperature of about 600° F. via heat-exchange with reaction product effluent in line 14, and is further heated in heater 42 to a temperature of about 1200° F. The thus-heated toluene-steam mixture leaves heater 42 through line 10, is admixed with the reaction product effluent from reactor 8 in line 9, and continues through line 10 at a temperature of about 1150° F. into reactor 11. The inlet pressure to reactor 11 will be within the preferred range of about 5.0 to about 40.0 p.s.i.g., and slightly lower than that at the inlet to reactor 8, to account for the pressure drop through the system between the two reaction zones. The catalyst disposed within reactor 11 may be different from that disposed within reactor 8 although, in most modifications of the present invention, the catalytic composite will be the same in both reactors 8 and 11. The reaction product effluent from reactor 11, at a temperature of about 1110° F., leaves via line 12 into heat-exchanger 5, wherein it supplies heat to the major portion of the incoming steam in line 3. The product effluent continues through line 13 into heat-exchanger 4 wherein it supplies heat to the steam-ethylbenzene mixture in line 1. Continuing through line 14, the product effluent enters heat-exchanger 15, wherein it raises the temperature of the steam-toluene mixture in line 38.

As hereinbefore stated, with respect to a typical prior art process, the dehydrogenation of ethylbenzene is generally effected at temperatures within the range of about 932° F. to about 1300° F., and the ethylbenzene and greater portion of the steam are heated to temperatures below the dehydrogenation temperature (932° F.), prior to being admixed and then heated to a temperature above the dehydrogenation temperature. With respect to the embodiment of the present invention illustrated in the accompanying drawing, it will be noted that the greatest proportion of the steam entering through line 3, at a temperature of about 365° F., is raised to a temperature of about 1000° F., which temperature is above the dehydrogenation temperature, but below the temperature of the reaction product effluent from reactor 8. The steam-benzene mixture in line 1, entering heat-exchanger 4 at a temperature of about 200° F., and leaving at a temperature of about 650° F., is below the dehydrogenation temperature of 932° F. Upon mixing the steam-ethylbenzene with the greater proportion of the steam in line 3, the latter at a temperature of 1000° F., the temperature of the total mixture is about 900° F. and is raised to the desired temperature at the inlet to the reaction zone, about 1150° F., in heater 6. On the other hand, the steam-toluene mixture in line 38 entering heat-exchanger 15 at a temperature of about 200° F., is heated therein to a temperature of about 600° F. This temperature is further raised in heater 42 to a level of about 1200° F. which temperature is above the dehydrogenation temperature, and greater than the temperature of the reaction product effluent from reactor 11. The hot toluene recycle-steam mixture is admixed with the reactor 8 product effluent in line 9, the temperature of the resulting mixture being that which is desired at the inlet to reactor 11.

The liquid hourly space velocity, in regard to the ethylbenzene, and defined as volumes of ethylbenzene charge per hour, per volume of catalyst disposed within the reaction zone, is generally within the range of from about 0.05 to about 10.0 and preferably within the range of about 0.1 to about 5.0. The mol ratio of steam to ethylbenzene charge is about 15:1, being within the range of from about 10:1 to about 20:1. In the embodiment illustrated in the drawing, a portion of the steam entering the process via line 3 is diverted to combine with the ethylbenzene charge in line 1, and a portion is diverted to combine with the toluene recycle in line 38. In both instances, the incoming steam is diverted in an amount in the range of about 3.0% to about 15.0% on a mol basis. The quantity of toluene in line 38 is such that the mol ratio of ethylbenzene to toluene within the system is within the range of from about 0.5:1 to about 10.0:1. With respect to reactors 8 and 11, the liquid hourly space velocity of the ethylbenzene, at any given time, is correlated with the selected inlet temperature, in the instant illustration about 1150° F., to result in a reactor product effluent having a temperature within the range of about 950° F. to about 1200° F., or in the instant situation, a temperature of about 1100° F. for reactor 8, and 1110° F. for reactor 11. The dehydrogenation reaction product effluent leaving reactor 11 via line 12 is utilized to supply heat to the incoming process streams, steam, ethylbenzene and toluene, in the following manner: the product effluent, at a temperature of about 1110° F., in line 12 passes into heat-exchanger 5, wherein it causes the temperature of the steam to be increased from a level of about 365° F. to a level of about 1000° F. The product effluent next passes through line 13 into heat-exchanger 4 wherein it is employed to raise the temperature of the steam-ethylbenzene mixture from a level of from about 200° F. to about 650° F. The product effluent leaving heat-exchanger 4 is at a temperature of about 700° F., and enters heat-exchanger 15 for the purpose of raising the temperature of the toluene recycle stream from about 200° F. to about 600° F.

The product effluent, leaving heat-exchanger 15 via line 19 is generally at a temperature not less than about 500° F. At temperatures below 500° F., through which temperature the product effluent must be cooled for the purposes of separation, styrene has the tendency to undergo polymerization to form large agglomerates of styrene polymer which causes plugginng of the various process lines. For this reason, the product effluent is cooled rapidly to a temperature of about 100° F. or lower, prior to passing into separator 17 via line 16. Condensate is removed via line 19 and vent gas, including hydrogen, carbon monoxide, carbon dioxide, ethane, ethylene, etc., is expelled from the process via line 18. The rapid cooling of the styrene-containing product effluent in line 16 may be effected in any suitable manner, and many means of accomplishing such cooling will be readily recognized by those possessing skill within the art. The styrene-containing liquid product effluent is removed from separator 17 through line 20, being passed into ethylbenzene column 21. Ethylbenzene column 21 is generally operated in such a manner that the ethylbenzene, toluene and a minor quantity of benzene formed as a result of the reactions being effected, passes overhead through line 23 into benzene-toluene column 24. The styrene-rich portion of the total dehydrogenation product effluent is recovered as a bottoms product in line 22, and is introduced into styrene column 39 from which the desired styrene product is recovered in a substantially pure state via line 40, the relatively small quantity of tars being removed from styrene column 39, and the process, via line 41. Benzene-toluene column 24 is utilized to separate an unreacted ethylbenzene-rich stream, which is recovered as a bottoms product in line 25 and is recycled to the process with the fresh ethylbenzene in line 1. It is generally preferred to operate column 24 in such a manner that a small quantity of toluene is removed with the ethylbenzene recycle in line 25. Although not indicated in the drawing, a portion of the toluene recycle may be diverted from line 38 into line 1, supplementing the toluene removed from column 24 through line 25, to provide toluene in the charge to reactor 8. The precise quantity of toluene so diverted will be dependent upon the conditions under which reactor 8 is operated. The benzene-toluene concentrate in line 26 is passed into treater 31. Treater 31 is employed to remove or react, from the benzene-toluene concentrate, trace quantities of styrene and any olefinic hydrocarbons which may have been formed during the reaction. The treated stream leaves treater 31 via line 32, containing valve 33, and passes through line 35 into benzene column 36. The character of the solid adsorbent, employed in treater 31 is not essential to the present invention; any suitable adsorbent or catalyst capable of producing a substantially pure benzene-toluene concentrate will suffice. At such time as the solid adsorbent and/or catalyst is no longer capable of so treating the benzene-toluene concentrate, valves 27 and 33 are closed, valves 28 and 34 are opened, and the benzene-toluene concentrate in line 26 is diverted through line 29 containing valve 28 into treater 30. The treated concentrate leaves treater 30 via line 35, containing valve 34, and is introduced into benzene column 36. Benzene column 36 is operated in a manner which permits recovery of a substantially pure benzene stream as an overhead product in line 37. Toluene and trace quantities of ethylbenzene form a bottoms product in line 38, and are recycled within the process via heat-exchanger 15, heater 42 and line 10. It may be desirable to recycle more toluene than normally produced from the ethylbenzene, thus make-up toluene from a suitable external source is introduced into line 38 via line 43.

It is understood that the various temperatures specifically mentioned in the foregoing description of the accompanying drawing, were for the sole purpose of illustrating one specific embodiment of the present invention. These temperatures will be subject to change, depending upon the temperature at the inlet to the reaction zones, being within the range of about 1050° F. to about 1300° F., the liquid hourly space velocity (with respect to the ethylbenzene), within the range of about 0.05 to about 10.0, and correlated with the inlet temperature to result in a reaction zone product effluent having a temperature within the range of about 950° F. to about 1200° F., and the precise character of the catalyst disposed within the reaction zone. Steam is employed for the purpose of supplying the necessary heat of reaction to effect the dehydrogenation of the ethylbenzene; it is also employed to avoid the incipient thermal decomposition of ethylbenzene, which thermal decomposition is nonselective, resulting in the random production of benzene and light gaseous material including carbon dioxide, carbon monoxide, ethylene, etc., and also to reduce the partial pressure of the primary reactants.

The following examples are given for the purpose of further illustrating the method of effecting the dehydrogenation process of the present invention, and to indicate the benefits to be afforded through the utilization thereof. As previously stated in regard to the description of the accompanying drawing, it is not intended to limit unduly the present invention to the operating conditions, concentrations of reactants, and/or the catalyst employed.

Example I

Utilizing a typical iron oxide dehydrogenation catalyst, 10–30 mesh, in an amount of 100 cc. (131.0 grams), ethylbenzene was dehydrogenated to produce styrene in a quartz, isothermal reactor. The latter was equipped with external heaters to maintain the temperature along the outside surface at a level of about 598° C. A temperature profile during the operation indicated a catalyst bed inlet temperature of 600° C., a minimum catalyst temperature of 574° C. and an outlet temperature of 594° C.

Ethylbenzene was charged to the system at a liquid hourly space velocity of 0.88, and in admixture with steam in an amount of 2.9 mols per mol of ethylbenzene. The reaction zone pressure was 6.9 p.s.i.g. at the inlet, and 5.9 p.s.i.g. at the outlet. The reaction zone product effluent was collected over a period of sixteen hours, and, upon analysis, indicated the following: the mol percent conversion of ethylbenzene was 65.3 and the efficiency of conversion to styrene was 89.9%.

A second operation was conducted in which the temperature profile indicated an inlet temperature of 601° C., a minimum catalyst temperatute of 582° C., and an outlet temperature of 596° C. The pressure at the inlet was 6.7 p.s.i.g., and 6.1 p.s.i.g., at the outlet of the reactor. Ethylbenzene was charged to the iron oxide catalyst at a liquid hourly space velocity of 0.61, and in admixture with 2.7 mols of steam per mol of ethylbenzene, and 1.2 pounds of toluene per pounds of ethylbenzene. The ethylbenzene conversion was 66.3%, and the efficiency of conversion to styrene was 92.3%, for an improvement of 1.0% on conversion, and 2.5% on efficiency.

The improvement resulting from the addition of toluene was surprising in view of the fact that efficiency increased, rather than decreased, while an increase in conversion was experienced. These unexpected results are reflected in the following example which is illustrative of a commercial operation on a unit designed to process about 485 barrels per day of fresh ethylbenzene charge.

Example II

This unit is designed as a single-zone unit in which the reactor consists of three individual catalyst beds, being equipped for steam injection between catalyst beds. As hereinbefore set forth, this type of reactor section typifies the current trend regarding high-conversion dehydrogenation systems. On a mols/hour basis, in which the charge to the reaction zone (into the first catalyst bed) contains 94.0 mols/hours of ethylbenzene, 0.9 mols/hour of toluene and 1.6 mols/hours of styrene, a total of 1,567 mols/hour of steam is utilized, of which about 32.8% is admixed with the charge to the first catalyst bed, 39.2% is injected between the first and second catalyst beds and about 28.0% is injected between the second and third catalyst beds. The pressure at the inlet of the reaction zone is 12.0 p.s.i.g., and the outlet pressure is 6.0 p.s.i.g. The temperature profile is such that the temperature at the inlet to the first catalyst bed is 1142° F, the outlet being 1016° F.; across the second catalyst bed, the temperatures are 1142° F. and 1076° F. and, across the third bed of catalyst, the temperatures are 1142° F. and 1108° F.

The following Table III summarizes the mol balance in and out of the reactor, and includes a tabulation of the net products.

TABLE III.—NO TOLUENE ADDITION

| Component | Mols/Hour | | Net Products |
|---|---|---|---|
| | In | Out | |
| Hydrogen | | 64.9 | 64.9 |
| Carbon Monoxide | | 0.2 | 0.2 |
| Carbon Dioxide | | 4.9 | 4.9 |
| Steam | 1,567.0 | 1,557.0 | −10.0 |
| Methane | | 1.5 | 1.5 |
| Ethane/Ethylene | | 0.2 | 0.2 |
| Benzene | | 1.9 | 1.0 |
| Toluene | 0.9 | 4.1 | 3.2 |
| Ethylbenzene | 94.0 | 37.6 | −56.4 |
| Styrene | 1.6 | 52.5 | 50.9 |
| Tar | | 0.2 | 0.2 |

Conversion: 100(56.4/94.0)=60.0%.
Efficiency: 100(50.9/56.4)=90.3%.

These results are compared to a multiple-zone unit as illustrated in the accompanying drawing. The pressure at the inlet to the first reaction zone is about 15.0 p.s.i.g., and the temperature about 1155° F., the outlet temperature being about 1100° F. The inlet temperature to the second reaction zone is 1150° F., the outlet temperature is about 1110° F., and the outlet pressure is about 9.5 p.s.i.g.

About 90.0% of the total amount of steam enters the first reaction zone, the remaining 10.0% being admixed with the toluene recycle. In this case, only 1,520 mols/hour of steam are utilized, and 65.0 mols/hours of toluene are utilized as a recycle stream. In this manner, the total number of mols charged to the unit per hour, remains the same. The mols/hour balance around the multiple zones, and the net products are tabulated in the following Table IV:

TABLE IV.—WITH TOLUENE RECYCLE

| Component | Mols/Hour | | Net Products |
|---|---|---|---|
| | In | Out | |
| Hydrogen | | 69.1 | 69.1 |
| Carbon Monoxide | | 0.2 | 0.2 |
| Carbon Dioxide | | 4.9 | 4.9 |
| Steam | 1,502.0 | 1,492.0 | −10.0 |
| Methane | | 2.0 | 4.6 |
| Ethane/Ethylene | | 0.2 | 0.2 |
| Benzene | | 3.8 | 3.8 |
| Toluene | 65.9 | 65.9 | |
| Ethylbenzene | 94.0 | 34.3 | −59.7 |
| Styrene | 1.6 | 57.1 | 55.5 |
| Tars | | 0.2 | 0.2 |

Conversion: 100(59.7/94.0)=63.5%.
Efficiency: 100(55.5/59.7)=93.0%.

A comparison of the data presented in Tables III and IV, reveals immediately several of the benefits afforded through the use of the present invention. First, the conversion of ethylbenzene has increased 3.5% from 60.0%, and the efficiency of conversion to styrene increased from 90.3% to 93.0%. If this increase in conversion had been achieved by increasing the severity of the operation, a styrene efficiency of about 87.0% would have been expected. Thus, the present invention provides about six percent efficiency advantage at comparable conditions. Furthermore, but not as apparent, the increased conversion did not effect an increase in the quantity of tar-like products in the product effluent. In most cases, there will be very little net toluene loss—in the instant case, there was no net loss of toluene. The benzene content of the product effluent increased two-fold, thereby enhancing considerably the marketability value of the overall product. This increase in benzene content is a further indication of the greater efficiency of ethylbenzene conversion.

The foregoing specification, and especially the specific examples, indicate the method by which the present dehydrogenation process is effected, and clearly show the benefits to be afforded through the utilization thereof. It will be readily recognized that the inventive concept herein described is advantageously applicable to both low and high conversion dehydrogenation processes.

I claim as my invention:

1. A process for dehydrogenating an alkyl aromatic hydrocarbon, having a side chain containing at least two carbon atoms per molecule, which comprises separately heating a first stream containing said alkyl aromatic hydrocarbon and a second stream comprising a monomethyl-substituted aromatic hydrocarbon and steam; admixing said heated first and second streams and contacting the resulting steam-hydrocarbon mixture with a dehydrogenating catalyst in a reaction zone at dehydrogenating conditions; separating said monomethyl-substituted aromatic hydrocarbon from the resulting reaction product effluent; and recovering the dehydrogenated product of said alkyl aromatic hydrocarbon, a portion of the heat imparted to said second stream during said separate heating thereof being obtained by indirect heat exchange with said reaction product effluent prior to separation of said effluent.

2. The process of claim 1 further characterized in that said alkyl aromatic hydrocarbon comprises ethylbenzene.

3. The process of claim 1 further characterized in that said monomethyl-substituted aromatic hydrocarbon comprises toluene.

4. The process of claim 1 further characterized in that the mol ratio of said alkyl aromatic hydrocarbon to said monomethyl-substituted aromatic hydrocarbon is within the range of from about 0.5:1 to about 10.0:1.

5. The process of claim 1 further characterized in that said steam-hydrocarbon mixture is heated to a reaction zone inlet temperature of from about 1050° F. to about 1300° F.

6. The process of claim 1 further characterized in that said alkyl aromatic hydrocarbon comprises diethylbenzene.

7. The process of claim 1 further characterized in that said alkyl aromatic hydrocarbon comprises isopropylbenzene.

8. A process for dehydrogenating ethylbenzene to produce styrene which comprises separately heating, each to a temperature above about 932° F., a first stream containing said ethylbenzene and a second stream compriisng toluene and steam; admixing said heated first and second streams to result in a steam-hydrocarbon mixture in which the ethylbenzene to toluene mol ratio is within the range of from about 0.5:1 to about 10.0:1; heating said mixture to a temperature of from about 1050° F. to about 1300° F., and contacting the heated mixture with a dehydrogenation catalyst in a dehydrogenating reaction zone at dehydrogenating conditions; separating toluene from the reaction product effluent and recycling the toluene to combine with said ethylbenzene; and recovering styrene from the remaining portion of said effluent, a portion of the heat imparted to said second stream during said separate heating thereof being obtained by indirect heat exchange with said reaction product effluent prior to separation of said effluent.

9. In a process for the dehydrogenation of an alkyl aromatic hydrocarbon, having a side chain containing at least two carbon atoms per molecule, wherein said alkyl aromatic hydrocarbon is admixed with steam and contacted with a dehydrogenating catalyst in a reaction zone at dehydrogenating conditions selected to result in a reaction product effluent having a temperature within the range of from about 950° F. to about 1200° F., the improvement which comprises the steps of:
 (a) heating said alkyl aromatic hydrocarbon to a temperature above about 932° F.;
 (b) separately heating a stream comprising steam and a monomethyl-substituted aromatic hydrocarbon to a temperature above about 932° F., a portion of the heat imparted to said stream being obtained by indirect heat exchange with said reaction product effluent, and commingling the thus heated stream with said alkyl aromatic hydrocarbon, forming a steam-hydrocarbon mixture having a temperature lower than said reaction product effluent;
 (c) heating said mixture to a temperature above that of said reaction product effluent; and
 (d) introducing said steam-hydrocarbon mixture to said reaction zone at dehydrogenating conditions as aforesaid.

10. The process of claim 9 further characterized in that said steam-hydrocarbon mixture is heated to a reaction zone inlet temperature of from about 1050° F. to about 1300° F.

11. The process of claim 9 further characterized in that said alkyl aromatic hydrocarbon comprises ethylbenzene.

12. The process of claim 8 further characterized in that said monomethyl-substituted aromatic hydrocarbon comprises toluene.

13. The process of claim 9 further characterized in that said steam-hydrocarbon mixture contains said alkyl aromatic and monomethyl-substituted aromatic hydrocarbons in a mol ratio of from about 0.5:1 to about 10.0:1 respectively.

14. A process for dehydrogenating an alkyl aromatic hydrocarbon, having an alkyl side chain containing at laest two carbon atoms per molecule, which comprises the steps of:
 (a) heating said alkyl aromatic hydrocarbon to a temperature below about 932° F., separately heating steam to a temperature above about 932° F., and commingling the thus heated streams:
 (b) heating the resulting mixture to a temperature of from about 1050° F. to about 1300° F., and contacting the heated mixture in a first reaction zone with a dehydrogenating catalyst and at dehydrogenating conditions selected to dehydrogenate at least a portion of said alkyl aromatic hydrocarbon;
 (c) separately heating a monomethyl-substituted aromatic hydrocarbon to a temperature above about 1050° F., a portion of the heat imparted thereto being obtained by indirect heat exchange with hot reaction product effluent from a second reaction zone as defined below, and commingling the first reaction zone product effluent therewith; and
 (d) passing the resulting mixture into a second reaction zone at a temperature of from about 1050° F. to about 1300° F., therein effecting additional dehydrogenation of said alkyl aromatic hydrocarbon, and withdrawing therefrom a hot reaction product effluent.

15. The process of claim 14 further characterized in that said alkyl aromatic hydrocarbon comprises ethylbenzene.

16. The process of claim 14 further characterized in that said monomethyl-substituted aromatic hydrocarbon comprises toluene.

17. The process of claim 14 further characterized in that the mol ratio of said alkyl aromatic hydrocarbon to said monomethyl-substituted aromatic hydrocarbon is within the range of from 0.5:1 to about 10.0:1.

18. The process of claim 14 further characterized in that the second reaction zone product effluent is separated to provide a monomethyl-substituted aromatic hydrocarbon stream which is recycled to said second reaction zone.

References Cited

UNITED STATES PATENTS

| | | | |
|---|---|---|---|
| 2,376,709 | 5/1945 | Mattox | 260—669 |
| 2,831,907 | 4/1958 | Mayfield et al. | 260—669 |
| 2,851,502 | 9/1958 | Bowman et al. | 260—669 |
| 3,118,006 | 1/1964 | Lovett et al. | 260—669 |

DELBERT E. GANTZ, *Primary Examiner.*

C. R. DAVIS, *Assistant Examiner.*